Patented Nov. 24, 1953

2,660,563

UNITED STATES PATENT OFFICE 2,660,563

MINERAL OIL CONTAINING SUBSTITUTED POLYOLEFINS

Fred W. Banes and Samuel B. Lippincott, Westfield, N. J., assignors to Standard Oil Development Company, a corporation of Delaware No Drawing. Application July 28, 1949,
Serial No. 107,368

11 Claims. (Cl. 252—56)

The present invention relates to oily derivatives of unsaturated hydrocarbon polymers and the like. It relates particularly to products obtained through the epoxide or episulfide derivatives of such polymers, especially those which are obtained by substituting other substituent groups for the epoxide oxygen or sulfur in such polymers. The invention pertains also to the use of the materials so derived in lieu of, or as additive components to, hydrocarbon oils, especially lubricating oils and the like. The invention relates also to a process for preparing said derivatives and for compounding them for use per se or with other conventional ingredients as lubricants and the like. The invention involves also as one particular feature the use of such polymer epoxide derivatives as additives for improving the viscosity index and/or reducing the pour points of conventional hydrocarbon lubricating oils and analogous compositions.

In the prior art it has long been known that certain unsaturated polymers, especially unsaturated hydrocarbon polymers such as natural rubber, polyisoprene, polybutadiene, butyl rubber, and the like, may be reacted with a suitable oxidizing material such as perbenzoic acid to yield epoxide derivatives, i. e., products wherein a double bond between carbon atoms is replaced by an oxygen bridge, e. g.

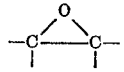

It is also known that the partially oxidized olefins may be polymerized, e. g., U. S. patent to Wiezevich, No. 1,981,819, to produce polymers having similar epoxide linkages. Thus, diene monoxides may be polymerized under certain conditions. The present invention, however, is based particularly upon the discovery that various olefinic hydrocarbon polymers may be oxidized to epoxides and the resulting epoxide groups may be substituted, modified or converted into various useful products by first opening up the oxygen bridge and then adding or substituting various substituents such as hydrogen, hydroxyl, metals, alkyl groups, acyl groups, amine groups, and the like.

Thus, the unsaturated bonds of ordinary unsaturated polymers, such as

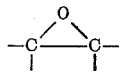

in the polymer, are first converted to the epoxide group

which forms a starting point for later substitutions. This oxidizing reaction may be continued until the polymer becomes completely saturated. The rate of oxidation or epoxidation varies greatly, depending upon the structure and type of polymer, the temperature, the presence or absence of catalyst, and the like.

The oxidation or epoxidation of the polymer may be complete or partial as desired. The degree of double bond saturation may be controlled by limiting the quantity of oxygen or oxygen-producing reagent used, or by control of the reaction conditions, e. g., temperature, catalyst, and/or time of reaction. The choice of the polymer obviously is important. Preferred polymers are those of butadiene, the copolymers of butadiene with monoolefins such as butene, styrene, substituted styrene, nitriles such as acrylonitrile, methacrylonitrile, esters of acrylic and methacrylic acid, and the like, especially where the monoolefin forms a minor part of the polymer. Other diolefins such as isoprene, piperylene, etc., may be used in lieu of butadiene. In general, the polymers of low to moderate molecular weight having a substantial proportion of unsaturated carbon-carbon bonds are useful.

According to the present invention, these oxygen-treated polymers, referred to hereinafter as epoxide or polyepoxide polymers, are opened up at the oxygen bridge and then the chosen substituents are added. The resulting modified polymers may be suitable for use as additive agents for modifying hydrocarbon and other lubricating oils and for many other purposes. Various of the derivatives so produced have been found to have particularly useful properties for improving the pour points of waxy mineral base lubricating oils. They are useful also as viscosity index improvers and they may be used also in ester type synthetic oils and other synthetic or natural oils where polymeric thickeners and modifiers have utility.

For the purposes of the present invention it is preferable to start off with polymeric raw materials having molecular weights between about 500 and 10,000. A preferred range is between about 1,000 and 6,000. Polymers of the 500 to 10,000 molecular weight range have intrinsic viscosities [$\eta$] of about 0.05 to 0.35. Those of the narrower range 1000 to 6000 have intrinsic viscosities of about 0.08 to 0.25. Since the intrinsic viscosity bears a fairly definite relationship to the molecular weight and can readily be determined by viscosity measurements of the polymer in solution, the approximate molecular weight can readily be determined from the relation:

$$[\eta_i] = 11 \times 10^{-4} M^{0.62}$$

where $$[\eta_i] = \frac{\ln \eta_r}{c}$$

$$\eta_r = \frac{\eta \text{ soln.}}{\eta \text{ solv.}} = \frac{t \text{ soln.}}{t \text{ solv.}}$$

where $c$ is the concentration of the polymer in grams per 0.1 liter of solvent (benzene) and $t$ is the time in seconds required to pass the liquid through a standard orifice, e. g., an Ubbelohde tube.

Polymers of the desired molecular weight range may be prepared by several known methods, i. e., (1) by emulsion polymerization, as described in the copending application of Frolich et al., Serial No. 637,782 U. S. Patent No. 2,500,983; (2) by solution polymerization as described in the copending application of Gleason et al., Serial No. 782,850 U. S. Patent No. 2,586,594; or (3) solution polymerization with an alkali metal type catalyst, as described in Sintelecheskii Kauchuk, No. 9, 6–12 (1936).

Having selected the desired polymer, those of butadiene-olefin type being preferred, though natural rubber and various synthetic rubber type polymers and copolymers can be used, the next step is to introduce the epoxide oxygen into the unsaturated bonds. The polymer is dissolved in a suitable solvent, such as benzene, chloroform, ethyl chloride, or the like, and the oxidizing agent is introduced. The per-acids or their salts, or the hydroperoxides may be used, the per-acids such as perbenzoic acid being preferred. Perbenzoic acid may be prepared in a known manner, e. g., as described by Braun (Organic Synthesis, Coll. vol. 1, p. 431) or by other means described in the same reference.

The following formulas indicate some of the many types of useful derivatives that can be prepared. These are representative of the present invention, but obvious additional variations will suggest themselves to those skilled in the art.

1. By the use of a hydrogen halide, the epoxide oxygen may be replaced by a hydroxyl group and a halogen, e. g., to form a chlorhydrin, and this product may be reacted with a fatty acid to form an ester. In the formula, R represents the aliphatic radical of a $C_8$ to $C_{20}$ fatty acid.

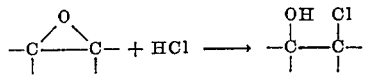

and

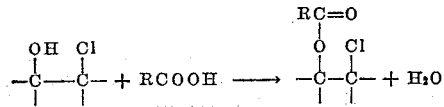

2. The epoxide may first be hydrogenated and then neutralized with an organic acid to form the half ester. The acid may be aliphatic or aromatic:

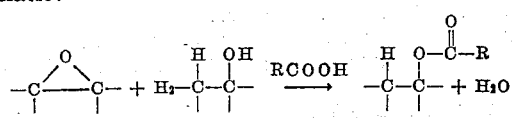

3. By treating with steam instead of hydrogen, the full ester may be obtained:

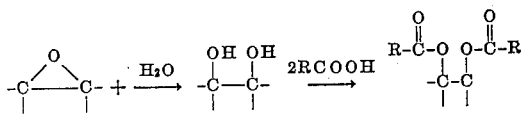

4. Alcohol may be added to the epoxide polymer to produce a mono-alkyl ether and the product thereafter may be esterified with a carboxylic acid to produce an ether ester:

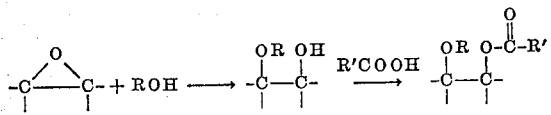

The foregoing formulas utilize the hydrolysis, hydration and hydrohalogenation products of the epoxide structure and comprise the preferred embodiment of the present invention. Other variations, which are not fully equivalent in some respects but which are analogous, are indicated in the following formulas. They appear to come within the broad scope of the invention.

In general, in Formulas 1 to 4, R and R' are linear or substantially linear alkyl groups of about 8 to 20 carbon atoms. In lieu of the carboxylic acids, acetylating agents such as the anhydrides or the acid chlorides may be used. Reactions with other acids such as HCN, or with ammonia or amines, $RNH_2$, $R_2NH$ may also be carried out. The thio counterparts of water, the alcohols, and the acids appear to be usable in the same general reactions. These and other variations are indicated in the formulas which follow:

5. By using sulfuric or sulfurous acid, a hydroxyl group and a sulfate (or sulfite) group may replace the bridged oxygen:

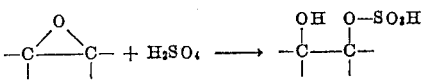

This may be neutralized with an alkali to form a salt, e. g.,

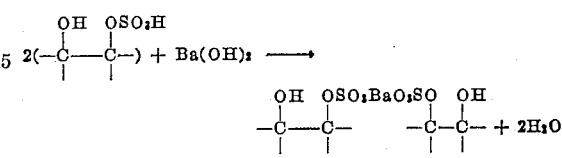

6. Likewise, with an acid sulfate or sulfite, the reaction product may be reacted with a metal halide salt to substitute one metallic element for another:

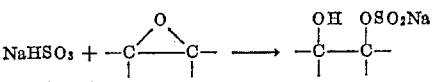

and

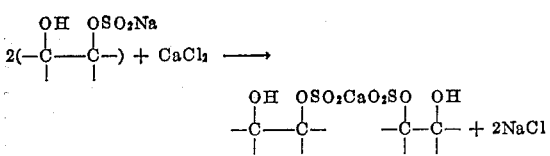

7. The same general result as in Formula 3 above may be obtained directly without the steam treatment if an aliphatic dibasic acid anhydride is used.

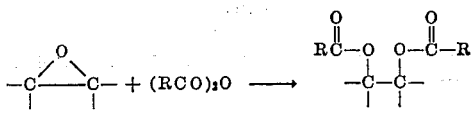

8. A half ester may be prepared by direct reaction with a carboxylic acid:

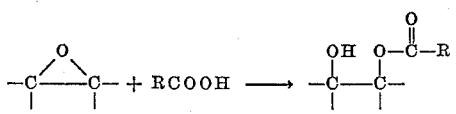

9. The product of Formula 8 may be fully esterified by adding more acid as in Formulas 2 and 3.

10. The cyanohydrin or hydroxynitrile may be produced by adding hydrocyanic acid to the epoxide polymer, and this may be converted to the carboxylate by addition of water, eliminating ammonia.

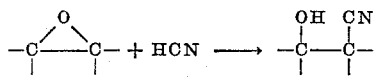

and

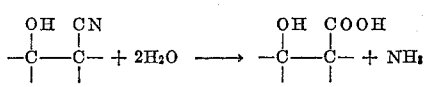

11. Ammonia may be added directly to produce the amine

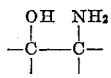

12. A primary amine $RNH_2$ may be added to produce the secondary amine

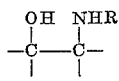

13. The addition of a secondary amine $R_2NH$ produces the tertiary compound

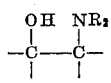

The latter may be reacted with a strong acylating agent such as an acid chloride to produce the tertiary amino-carboxylate according to the formula:

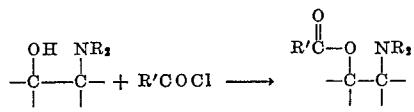

14. An aldehyde may be reacted with the epoxide polymer:

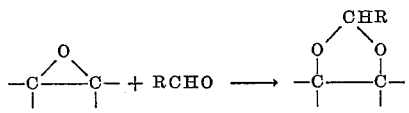

15. Likewise, a ketone may be used to produce the ketal

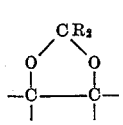

16. A reaction similar to that of Formula 4 above, may be carried out with a mercaptan, followed by esterification with a carboxylic acid to produce the mixed ester and thioether:

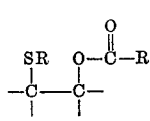

17. A similar type of reaction may take place with $H_2S$ to form the mixed alcohol-mercaptan according to the formula:

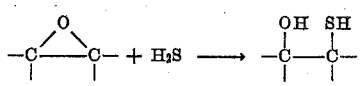

This may be esterified with a suitable acid as in the case of Formula 16. Or, by treatment with an oxidizing agent or sulfur chloride, a sulfide, disulfide or a polysulfide may be produced:

18. By the use of a thioether $RSR'$, where R or $R'$ may be either alkyl or aryl, the mixed ether-sulfide (or ether-thioether) may be prepared:

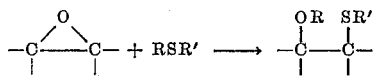

19. The thiocyanate derivative substitutes bridged sulfur for the bridged oxygen according to the following equation:

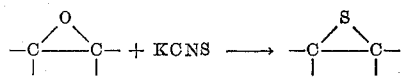

The sulfur compound may be treated as in the above formulas to produce the corresponding thio compounds.

It is apparent that the above formulas involve an almost infinite number of possibilities, too numerous to investigate all of them in detail. Of the compounds so prepared which have been investigated to date, a considerable number appear promising as lubricating oil additives to improve viscosity index, depress pour points, provide detergency (especially Formulas 5 and 6 above), and also for the production of ion exchange resins.

It should be noted also that it is not always necessary to convert the polymer to the epoxide as an intermediate. In many cases, it may be oxidized directly to a polyhydroxy compound, for example, or to the corresponding chlorhydrin.

The invention will be understood more fully after a consideration of the following specific examples:

EXAMPLE I

A polybutadiene was prepared by the well known emulsion polymerization technique, as disclosed in an application filed by Frolich et al., December 28, 1945, Serial No. 637,782. The temperature and other polymerization conditions were adjusted so that the product was a viscous oil having an average molecular weight of about 2750 and an intrinsic viscosity $\eta$ of about 0.15.

A solution of 5.4 grams of the above polymer was prepared in 50 ml. of chloroform. This solution was mixed with 450 ml. of a solution of perbenzoic acid in chloroform prepared as per Braun, Org. Syn. Coll., vol. I, p. 431. A 10% excess of the perbenzoic acid was provided above stoichiometric requirements. The resulting solution was left on ice for 24 hours, after which 40 grams of a commercially available mixture of $C_{10}$ to $C_{18}$ aliphatic alcohols (sold under the trade name of "Lorol B") and 10 cc. of the ether complex of $BF_3$ were added. "Lorol B" alcohol is understood to consist of about 3% $C_{10}$, 46% $C_{12}$, 24% $C_{14}$, 10% $C_{16}$ and 17% $C_{18}$ aliphatic alcohols.

The mixture of alcohols, polymer and catalyst was left at room temperature, about 25° C., for an hour and thereafter was washed with water to remove the $BF_3$. Thereafter, the solvent chloroform and the excess "Lorol B" alcohol were removed by vacuum distillation, finishing the evaporation at 200° C. at 1 to 2 mm. pressure.

The residue, a soft resinous mass, weighed 16.5 grams. It was taken up in 200 ml. of benzene and 56 grams of stearic acid were added. Two grams of p-toluenesulfonic acid were added as a catalyst and the mixture was refluxed, the water of esterification being removed. The amount of water recovered indicated that esterification had been essentially quantitative. The reaction mixture was next diluted with ethyl ether and saturated with gaseous ammonia. This resulted in the precipitation of excess stearic acid as ammonium stearate which was removed by filtration. The filtrate product evidently was a polybutadiene having its originally unsaturated carbon to carbon bonds replaced, or at least a substantial proportion of them replaced by the structure

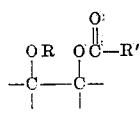

where R is the $C_{10}$ to $C_{18}$ or $C_{10}$ to $C_{20}$ aliphatic alcohol radical and R' is the stearyl radical. R' may be any alkyl group of 10 to 20 carbon atoms.

The filtrate was next heated over a steam bath to evaporate the ether and was thereafter heated to 100° C. at 1 to 2 mm. of mercury pressure to remove volatile matter. The residue weighed 36.5 grams and was a rather dark soft plastic material which solidified to a soft solid at room temperature.

The product prepared as above was tested by blending it in two different lubricating oils. Oil A was a neutral Mid-Continent stock blended with 3.5% Pennsylvania Bright stock, the mixture having a viscosity of about 44 S. S. U. at 210° F. and a viscosity index of 98. Oil B was a naphthenic oil having a viscosity of about 45 S. S. U. at 210° F. and a viscosity index of about 115. The effects on pour point of these oils of various proportions of the modified polymer of Example I are indicated in the following table.

Table I

| Test oil | Percent concentration of polymer | ASTM pour point, °F. | Solid point, °F. |
| --- | --- | --- | --- |
| A | 0 | +30 | +20 |
| A | 0.25 | +5 | <-22 |
| A | 0.5 | -20 | <-22 |
| A | 1.0 | -25 | (¹) |
| B | 0 | +5 | (¹) |
| B | 0.25 | -10 | (¹) |
| B | 0.5 | -5 | (¹) |
| B | 1.0 | -5 | (¹) |

¹ Not tested.

EXAMPLE II

The procedure of Example I was repeated, using a butadiene polymer of about 1650 molecular weight with intrinsic viscosity $\eta$ of about 0.10, prepared by using metallic sodium as the catalyst according to the procedure set forth in Sintelecheskii Kauchuk, No. 9, 6-12 (1936), mentioned above. The yield of product, prepared from 5.4 grams of polybutadiene was 25.5 grams. In appearance, this product was very much like the final polymer of Example I and it was blended with the same lubricating oils. Other butadiene polymers of molecular weight from as low as 500 to as much as 10,000 are very suitable, as suggested above, especially those having the proper intrinsic viscosity. The pour point data obtained, using various concentrations as in Example I, are shown in the following table:

Table II

| Test oil | Percent concentration of polymer | ASTM pour point, °F. | Solid point, °F. |
| --- | --- | --- | --- |
| A | 0 | +30 | +20 |
| A | 0.25 | -5 | <-22 |
| A | 0.5 | -10 | <-22 |
| A | 1.0 | -30 | (¹) |
| B | 0 | +5 | (¹) |
| B | 0.25 | -10 | (¹) |
| B | 0.5 | -10 | (¹) |
| B | 1.1 | -10 | (¹) |

¹ Not tested.

The data obtained in Examples I and II indicate that the esterified alcohol derivative of the epoxide of polybutadiene is a potent pour point depressant for paraffinic oils. The related long chain derivatives such as the esters of the chlorhydrin derivative, esters of hydrogenated epoxides, esters of steam or water derivatives, esters obtained directly by treatment with acids, the long chain alkylated products obtained by treatment with aldehydes, or ketones, the long chain primary and secondary amines, the ethers and thioethers, as set forth in the various formulas given above, all appear to have the same general properties, provided the alkyl chain lengths are properly adjusted. In general, the alkyl groups which impart oil solubility and also provide the pour point depression should have an average chain length of about 8 to 20 carbon atoms, 10 to 18 being generally preferred.

The miscellaneous metallic derivatives of the products in the formulas above which form metal salts may have additional desirable properties in mineral oils, such as detergency.

In Formulas 1 to 4, above, especially, it is preferred that R and R' be linear or substantially linear alkyl groups of 8 to 20 carbon atoms. It is recognized of course that acetylating agents such as the anhydrides or acid chlorides may be used interchangeably with the carboxylic acids shown in the above equations.

Other reactions of the epoxides, for example, with HCN, $NH_3$, $RNH_2$, or $R_2NH$ appear to take place easily enough. The thio counterparts of water, alcohols and acids appear to be of at least theoretical interest. With respect to the thio compounds corresponding to the epoxides, i. e., those of structure

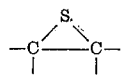

it does not appear that these can be obtained directly from reaction of the unsaturated polymer with a sulfur containing compound. It is possible, however, to obtain this structure by reacting the epoxide with KCNS as in Formula 19 above and this structure evidently could in turn undergo the reactions listed in Equations 1 to 4.

The following summarizes the synthesis and evaluation data pertaining to a polymer of the present invention wherein the type of polymer and method of preparing the final derivative are different from those reported in previous examples.

EXAMPLE III

A polybutadiene polymer of about 4500 molecular weight, having an intrinsic viscosity $\eta$ of 0.207, was prepared by solution polymerization with a peroxide catalyst as per the procedure described in application Serial Number 782,850 filed October 29, 1947, by Banes, Arundale and Gleason. Eight grams of this polymer were dissolved in a chloroform solution containing 24.1 grams of perbenzoic acid. The solution was allowed to stand 24 hours at 48° F. after which 90 g. of stearic acid, 5.0 ml. of an aqueous solution of HCl (10% conc.), and 0.5 g. of toluene sulfonic acid were added to the solution. This solution was then refluxed and water and chloroform removed. When 7.2 ml. of water had been removed, the solution was washed with water and then the residual solvent removed under vacuum. The residue was taken up in ethyl ether and ammonia bubbled through the ether solution to precipitate unreacted stearic acid.

This ammonium stearate was removed by filtration and the filtrate evaporated to dryness to give 45 g. of a viscous polymeric material. Portions of this product were blended with two types of oils to give concentrations of 1.0, 0.5 and 0.25 weight per cent additive on the oil. The results obtained from these blends are given below:

*Table III*

| Test oil | Percent concentration of additive on oil | ASTM pour point, ° F. | V. I. | Solid point, ° F. |
|---|---|---|---|---|
| A | 0 | +30 | 98 | |
| A | 0.25 | −15 | 110 | −20° F. |
| A | 0.50 | −15 | 103 | Slight sludge at −20° F. |
| A | 1.00 | −15 | 101 | <−20°F. |
| B | 0 | +15 | 115 | |
| B | 0.25 | −10 | 120 | Slight sludge at −20° F. |
| B | 0.50 | −15 | 119 | <−20° F. |
| B | 1.00 | −15 | 116 | <−20° F. |

These data demonstrate that useful additives may be prepared by direct esterification of polymeric epoxides.

While the new modified polymer products of this invention appear to have particular utility as additives for lubricating oil in amounts varying from about 5.0% to 0.10%, their uses have not been fully investigated and it appears that they may have valuable properties as plastics, synthetic resins, plasticizers, ingredients of paints and varnishes, and others too numerous to mention.

In its process aspects, the invention comprehends particularly the production of a polymerized or copolymerized multiolefin of about 4 to 14 carbon atoms, preferably 4 to 10 carbon atoms, such as butadiene, pentadiene, and their alkylated derivatives and homologues. The polymer is produced so that it has a substantial degree of unsaturation, i. e., a considerable number of unsaturated double bonds in each molecule. An unsaturation of about 5 to 20% is preferred. These unsaturated carbon to carbon bonds are thereafter saturated, preferably quite completely, by adding oxygen. Then the various substitutions for the epoxide oxygen, as described above, may be made as desired.

In its product aspects, the invention comprehends both the substituted or modified polymer itself, and compositions containing it as a characteristic, distinctive or substantial ingredient. The modified polymer products listed in the various Formulas 1 to 19, inclusive, along with their obvious variants, as well as the specific products of the examples and their self-evident equivalents, with or without mineral lubricating oils and the like are also considered inherent parts of this invention.

For the starting material, any of the polymerized multiolefins, preferably the di- and triolefins of 4 to 14 carbon atoms and their copolymers with olefins, of molecular weight from about 200 to about 40,000 or more, may be used. These polymers may also include aryl constituents and may vary widely in their physical characteristics. The esterification, amination, hydrogenation, etc., may be complete or only partial, but should be carried out to at least a substantial degree in order to stabilize the final modified polymeric product.

The "solid point" referred to in the tables above, is the point at which the oil solidifies when subjected to the "S. O. D. Pour Stability Test, Cycle A," as defined in "Quarterly Transactions" SAE, January, 1948, volume II, No. 1, pages 34 to 44.

What is claimed is:

1. A composition comprising a mineral oil containing from 5.0% to 0.10% of a modified polymer of a multiolefin, said polymer having a substantial proportion of its original unsaturated carbon to carbon bonds substituted by the structure

where X and Y are each selected from the group consisting of —OR, and

R being an alkyl radical of from 10 to 20 carbon atoms.

2. A composition comprising a mineral oil containing from 5.0% to 0.10% of a polybutadiene composition of 200 to 40,000 molecular weight having at least a substantial proportion of its unsaturated carbon to carbon bonds replaced by the structure

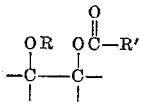

where R and R' are aliphatic hydrocarbon groups of about 10 to 20 carbon atoms.

3. Composition according to claim 2 wherein the polybutadiene has a molecular weight of about 500 to 10,000 and intrinsic viscosity between .05 and 0.35.

4. Composition according to claim 2 wherein the polymer has molecular weight between 1,000 and 6,000 and intrinsic viscosity between 0.08 and 0.25.

5. A composition comprising a mineral oil containing from 5.0% to 0.10% of a diene polymer composition of molecular weight between 1,650 and 4,500 having intrinsic viscosity between about 0.10 and 0.207, said polymer having a substantial proportion of its original unsaturated carbon to carbon bonds substituted by the structure

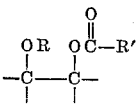

where R is a $C_{10}$ to $C_{18}$ alkyl radical and R' is a stearyl radical.

6. Composition according to claim 5 wherein the diene polymer has a molecular weight of about 2,750 and is of about 0.15 intrinsic viscosity.

7. Composition according to claim 5 wherein said diene polymer has a molecular weight of about 1,650 and has an intrinsic viscosity of about 0.10.

8. Composition according to claim 5 wherein said diene polymer is of about 4,500 molecular weight and has an intrinsic viscosity of about 0.207.

9. A composition comprising a mineral oil containing from 5.0% to 0.10% of a polybutadiene composition of 200 to 40,000 molecular weight having at least a substantial proportion of its unsaturated carbon to carbon bonds replaced by the structure

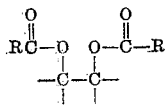

where R is an aliphatic hydrocarbon group of about 10 to 20 carbon atoms.

10. Composition according to claim 9 wherein the polybutadiene has a molecular weight of about 500 to 10,000 and intrinsic viscosity between .05 and 0.35.

11. Composition according to claim 9 wherein the polymer has molecular weight between 1,000 and 6,000 and intrinsic viscosity between 0.08 and 0.25.

FRED W. BANES.
SAMUEL B. LIPPINCOTT.

References Cited in the file of this patent

UNITED STATES PATENTS

| Number | Name | Date |
|---|---|---|
| 2,054,099 | Rothrock | Sept. 15, 1936 |
| 2,142,980 | Huijser | Jan. 3, 1939 |
| 2,370,943 | Dietrich | Mar. 6, 1945 |
| 2,384,595 | Blair, Jr. | Sept. 11, 1945 |
| 2,460,195 | Segall | Jan. 25, 1949 |

OTHER REFERENCES

Cole et al., Ind. and Eng. Chem., vol. 39, No. 2, pp. 174–179, February 1947.

Columbia Technical Bulletin; BMO-44-1, Pittsburgh Plate Glass Co., February 1945.